2,822,325

PROCESS OF, AND COMPOSITION FOR CLEANING AND TINNING

Edwin M. Tinnon, Port Chester, N. Y., and Ivor L. Simmons, Metuchen, N. J., assignors to Metal & Thermit Corporation, New York, N. Y., a corporation of New Jersey No Drawing. Application February 11, 1955
Serial No. 487,718

6 Claims. (Cl. 204—26)

This invention relates to re-tinning of the interiors of cooking utensils which have become discolored and worn through use. Because the re-tinning process involves the use of a tinning solution at an elevated temperature, the process is particularly applicable to utensils of the kind having a built-in electrical heating unit, such as electric coffee percolators. It is not essential however that the heat be derived from an electric current, nor that the conversion of electricity into heat be effected in a heating element which forms a unitary part of the utensil being re-tinned.

It is a salient feature of the invention that the utensil to be re-tinned is merely made to contain a cleaning and plating solution at an elevated temperature for a sufficient length of time to accomplish the desired purpose. Because of this characteristic, the re-tinning process can be effected in the home by anyone who is capable of following simple directions. It requires no special equipment, no source of electroplating current, no disassembly and re-assembly of the parts of the utensil, and no shopping or shipping. Since there is no need for complete submergence, a heating unit, if present, is not exposed to flooding by the tinning solution.

The tinning can be effected by any known immersion or contact method. In the immersion method, the immersion is effected simply by filling the utensil with the tinning solution and heating it. In the contact method, the utensil is also made to contain a hot tinning solution, but aluminum is placed in contact with the solution and with the surface to be coated at one or more points.

By way of illustration, the following specific example is given of a procedure which has been successfully followed in re-tinning the interior of an electric coffee percolator.

The particular percolator chosen was a percolator having a capacity of two liters. It had a copper body which was chromium plated on the outside and which had originally been tin plated on the inside. At the time of the re-tinning, however, the percolator was badly stained and worn on the inside. In the base there was an electric heating unit which required merely to be plugged in and switched on. This unit could be adjusted to vary the heat intensity.

Two liters of solution containing the following chemicals were made up:

7.5 grams per liter potassium hydroxide;
120.0 grams per liter potassium stannate;
50.0 grams per liter Versene powder;
50.0 grams per liter trisodium phosphate;
10.0 cubic centimeters per liter "Tergitol wetting agent 08."

The coffee percolator, without previous cleaning or scouring treatment, was filled with the above solution. Two aluminum lugs were thrown in and a piece of aluminum sheet was dipped inside in contact with the solution and with the percolator wall. The solution was heated by the use of the percolator's own heating element. After seventeen minutes of heating, ten grams per liter of potassium carbonate were thrown in. The heat was so regulated that the solution was kept bubbling or simmering but not actively or violently boiling.

The solution turned a dark brown, and from time to time some of the solution was poured off for inspection of the interior and then returned to the percolator. After 121 minutes, the solution was poured off and the percolator was thoroughly washed with water. Tinning and cleaning were found to be excellent. It should be noted that the particular percolator was initially in very bad condition, and that normally the process can be completed in considerably less time than two hours.

As a rule "Duponol ME Dry" is preferable to "Tergitol Wetting Agent 08" because the latter is a liquid and therefore presents a packaging difficulty, while the former is a solid and can be conveniently mixed along with the other named chemicals in a dry form and in desired proportions.

Solutions with the following composition limits have been found successful in carrying out the re-tinning process:

Potassium hydroxide 3.0 to 8.0 grams per liter of total solution;
Potassium stannate 60.00 to 120.0 grams per liter of total solution;
Potassium carbonate 0 to 10.0 grams per liter of total solution;
Versene powder 50.0 to 100 grams per liter of total solution;
Trisodium phosphate 30.0 to 60.0 grams per liter of total solution;
"Duponol ME Dry" .5 to 1.0 gram per liter of total solution.

Potassium hydroxide, potassium stannate and potassium carbonate are the coating agents and require no explanation. The potassium carbonate improves the tinning but is not essential. Corresponding sodium compounds in the same molecular concentration ranges may be used in place of the potassium compounds.

The Versene, "Duponol" and trisodium phosphate ingredients are all parts of the detergent system. The specified concentrations are adequate for meeting the most severe conditions. The proportions of these ingredients can be reduced in some circumstances. Since it is proposed however to package and sell a mixture of dry ingredients for use in the household, it is preferred to include sufficient detergents for meeting the most severe requirements. Any surplus over actual requirements in milder cases will do no harm.

Versene powder is the tetrasodium salt of ethylenediamine tetra-acetic acid having the formula:

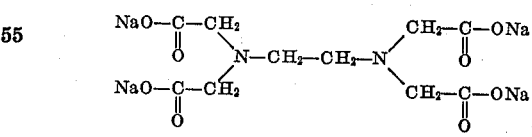

The wetting agent sold under the trade-name "Duponol" is sodium lauryl sulphate plus impurities. The wetting agent sold under the trade-name "Tergitol Wetting Agent 08" is a 38% aqueous solution of sodium octyl sulphate of formula

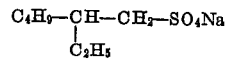

Other detergents may be used. It is desirable, however, that the detergents shall not foam excessively.

Other cleaning agents which may be used in place of the Versene powder and the trisodium phosphate include the following:

Sodium metasilicate ($Na_2SiO_3$·hydrated)
Sodium borate
Sodium carbonate ($Na_2CO_3$)
Sodium hexametaphosphate ($Na_6(PO_3)_6$)
Tetrasodium pyrophosphate ($Na_4P_2O_7$·$10H_2O$).

The corresponding potassium salts may be used where applicable.

Other wetting agents which may be employed are:
(1) Sodium alkyl phosphates.
(2) Any one of the alkyl-phenoxy-polyoxyethylene ethanols.

As has been indicated, the purpose is to provide the householder with a package containing a composition for use in re-tinning utensils, which composition includes the coating, cleaning and wetting agents in the requisite proportions to yield, when dissolved in the correct amount of water, a solution having a composition lying within the limits previously set forth, together with one or more pieces of metallic aluminum. A typical composition would meet the following specifications:

| Ingredient: | Weight range, grams |
| --- | --- |
| Potassium hydroxide | 3 to 8 |
| Potassium stannate | 60 to 120 |
| Potassium carbonate | 0 to 10 |
| Versene | 50 to 100 |
| Trisodium phosphate | 30 to 60 |
| "Duponol ME Dry" | .5 to 1 |

Any suitable inert filler or carrier may be incorporated in the above compositions. By way of example, may be mentioned diatomaceous earth or the like.

The foregoing weights are consistent with the range table hereinbefore set forth. When substitutions are made, of any of the previously described alternative materials, the molar equivalent quantities are used.

Any presently known equivalent for the ingredients referred to above which would not be incompatible with the other ingredients of the composition, may be substituted in any proportions known to be capable of use in effectively cleaning and tinning the interior of a utensil by the procedure described, without departing from the invention.

It is not essential that the utensil to be tinned shall include an electrical heating unit of its own. The heat may be supplied as in cooking by a wood, coal, gas, electric or other stove. The solution is desirably brought substantially to boiling temperature and the intensity of the heat is then reduced to maintain substantially a simmering temperature. In some instances, the solution may be preliminarily heated to boiling temperature and poured into the utensil, being left without further heating to effect the tinning operation. The solution may be poured off from time to time for reheating and put back into the utensil if, in a particular case, the utensil cannot be reheated without damage by the heating means at hand.

We have described what we believe to be the best embodiments of our invention. We do not wish, however, to be confined to the embodiments shown, but what we desire to cover by Letters Patent is set forth in the appended claims.

We claim:

1. A dry tinning and cleaning composition adapted to be dissolved in water to provide a cleaning and tinning solution, said dry composition consisting essentially of 3 to 8 grams of potassium hydroxide, 60 to 120 grams potassium stannate, 0 to 10 grams of potassium carbonate, 50 to 100 grams of Versene, 30 to 60 grams of trisodium phosphate and .5 to 1 gram of sodium lauryl sulphate.

2. An aqueous cleaning and tinning solution having essentially the following composition:

| | Grams per liter of total solution |
| --- | --- |
| Potassium hydroxide | 3.0 to 8.0 |
| Potassium stannate | 60.0 to 120.0 |
| Potassium carbonate | 0.0 to 10.0 |
| Versene | 50.0 to 100 |
| Trisodium phosphate | 30.0 to 60 |
| Sodium lauryl sulfate | .5 to 1.0 |

3. An aqueous cleaning and tinning solution consisting essentially of 7.5 grams per liter of potassium hydroxide, 120.0 grams per liter of potassium stannate, 50.0 grams per liter of Versene, 50.0 grams per liter of trisodium phosphate and 10.0 cc. per liter of a 38% aqueous solution of sodium octyl sulphate.

4. A method of simultaneously cleaning and retinning the interior of a copper bodied cooking utensil which comprises filling the utensil with an aqueous solution of the cleaning and tinning composition defined in claim 1, placing solid aluminum in contact with said solution and with said utensil, and maintaining said solution in the vicinity of its boiling temperature for sufficient time to clean said utensil and to cause a layer of tin to be deposited on the interior of said utensil.

5. A method of simultaneously cleaning and retinning the interior of a copper bodied cooking utensil which comprises filling the utensil with an aqueous composition defined in claim 2, placing solid aluminum in contact with said solution and with said utensil, and maintaining said solution in the vicinity of its boiling temperature for sufficient time to clean said utensil and to cause a layer of tin to be deposited on the interior of said utensil.

6. A method of simultaneously cleaning and retinning the interior of a copper bodied cooking utensil which comprises filling the utensil with an aqueous solution of the cleaning and tinning composition defined in claim 3, placing solid aluminum in contact with said solution and with said utensil, and maintaining said solution in the vicinity of its boiling temperature for sufficient time to clean said utensil and to cause a layer of tin to be deposited on the interior of said utensil.

References Cited in the file of this patent

UNITED STATES PATENTS

| | | |
| --- | --- | --- |
| 744,170 | Darley | Nov. 17, 1903 |
| 2,195,409 | Flett | Apr. 2, 1940 |
| 2,370,986 | Nachtman | Mar. 6, 1945 |
| 2,392,646 | Cooper et al. | Jan. 8, 1946 |
| 2,432,718 | Blackburn | Dec. 16, 1947 |
| 2,586,099 | Schultz | Feb. 19, 1952 |

OTHER REFERENCES

Wilson et al.: "Contact Tin Plating," Electroplating and Metal Finishing, vol. 4, pages 274–276, September 1951.

"Versenes," Bersworth Chemical Company Framingham, Mass., Fed. 1952.

"Electrodeposition of Tin," Kern, E. F., Apr. 15, 1913, paper, presented at General Meeting of American Electrochemical Society, 1913.